(12) United States Patent
Chen

(10) Patent No.: US 9,323,707 B2
(45) Date of Patent: Apr. 26, 2016

(54) UNIVERSAL SERIAL BUS SIGNAL TEST DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Jie Chen, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 436 days.

(21) Appl. No.: 13/965,231

(22) Filed: Aug. 13, 2013

(65) Prior Publication Data

US 2014/0089554 A1    Mar. 27, 2014

(30) Foreign Application Priority Data

Sep. 25, 2012   (CN) .......................... 2012 1 0360072

(51) Int. Cl.
*G06F 11/16* (2006.01)
*G06F 13/40* (2006.01)
*G06F 13/00* (2006.01)

(52) U.S. Cl.
CPC .................................. *G06F 13/4027* (2013.01)

(58) Field of Classification Search
CPC ......... G06F 11/16; G06F 13/36; G06F 11/00; G06F 13/00
USPC ...................................... 714/25; 710/314, 305
See application file for complete search history.

(56) References Cited

U.S. PATENT DOCUMENTS

| | | | | |
|---|---|---|---|---|
| 6,393,588 B1* | 5/2002 | Hsu | ...................... | G06F 11/261 710/105 |
| 6,829,726 B1* | 12/2004 | Korhonen | ............. | G06F 11/273 710/5 |
| 8,769,343 B2* | 7/2014 | Jaramillo | .............. | G06F 11/221 702/117 |
| 2008/0170610 A1* | 7/2008 | Harper | ................... | G06F 11/24 375/226 |
| 2013/0151898 A1* | 6/2013 | Hou | ...................... | G01R 31/045 714/27 |
| 2013/0250709 A1* | 9/2013 | Chen | ................ | G11C 29/56016 365/201 |
| 2013/0304967 A1* | 11/2013 | Hanafusa | ............ | G06F 12/0246 711/103 |
| 2015/0205744 A1* | 7/2015 | Grossman | ........... | G06F 13/4282 710/316 |

* cited by examiner

*Primary Examiner* — Christopher Shin
(74) *Attorney, Agent, or Firm* — Novak Druce Connolly Bove + Quigg LLP

(57) ABSTRACT

A universal serial bus (USB) signal test device includes a printed circuit board. A first connector, a second connector, and a number of USB hub integrated circuit (ICs) are arranged on the printed circuit board. The USB hub ICs are connected in series. A USB signal is passed through the USB hub ICs and an auxiliary test device in that order. The USB signals are measured with an oscilloscope after being passed through the USB hub ICs and the auxiliary test device.

3 Claims, 2 Drawing Sheets

UNIVERSAL SERIAL BUS SIGNAL TEST DEVICE

BACKGROUND

1. Technical Field

The present disclosure relates to a universal serial bus (USB) signal test device.

2. Description of Related Art

In USB signal integrity testing, according to test standards, a test signal should be transmitted six times. Typically, five USB hubs and an auxiliary test device are used to transmit the test signal for six times. However, all devices are manually connected in this testing method, which is inconvenient and easily causes error.

Therefore, there is room for improvement in the art.

BRIEF DESCRIPTION OF THE DRAWINGS

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

DETAILED DESCRIPTION

Figure 1:
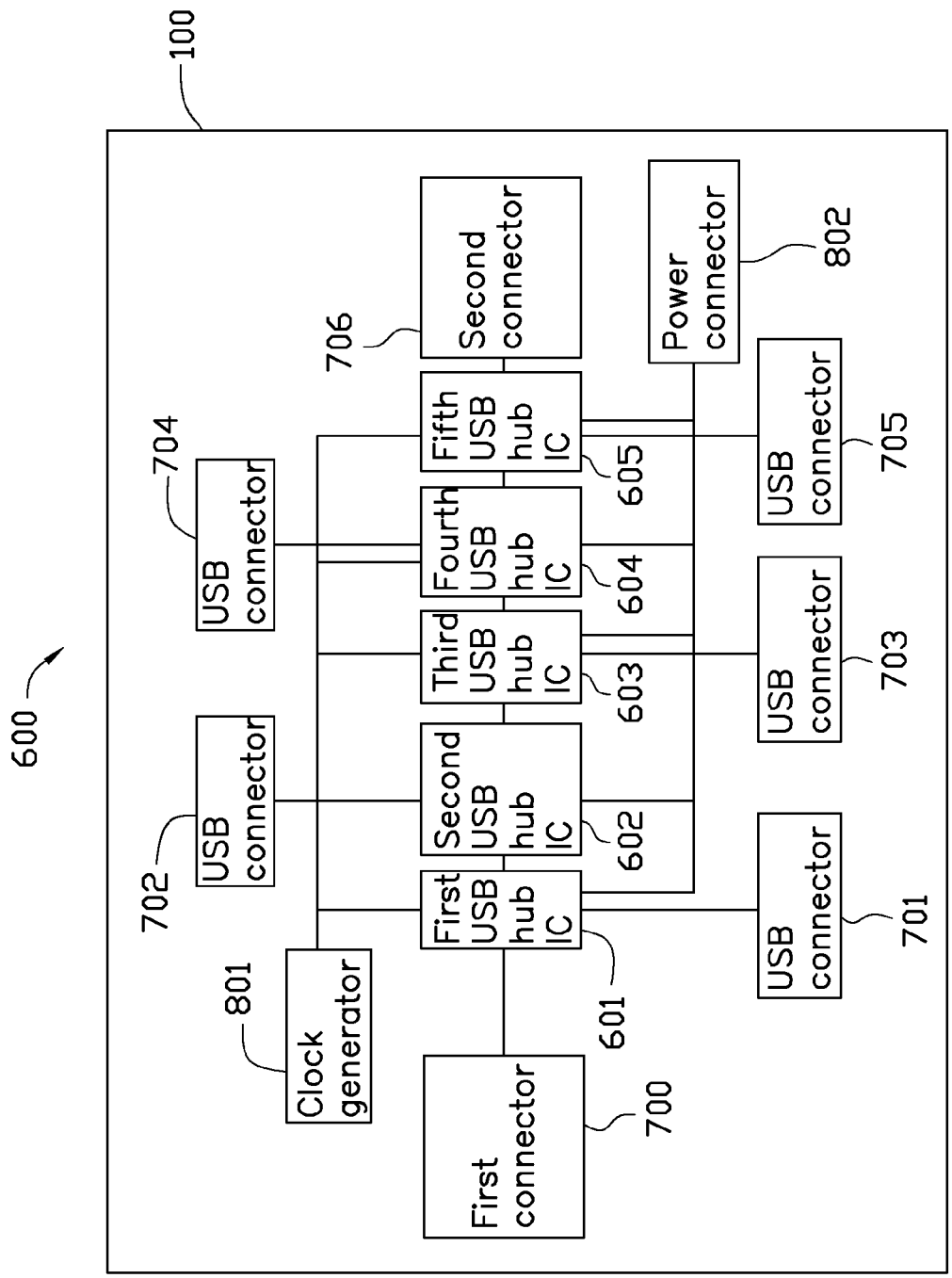
FIG. 1 is a block diagram of an embodiment of a universal serial bus (USB) signal test device of the present disclosure.

FIG. 1 shows an embodiment of a universal serial bus (USB) signal test device 600 of the present disclosure.

The USB signal test device 600 includes a printed circuit board (PCB) 100. A first connector 700, a second connector 706, and first to fifth USB hub integrated circuits (IC) 601-605 are on the PCB 100. The first to fifth USB hub IC 601-605 are connected in series. Each of the first to fifth USB hub IC 601-605 includes three groups of pins used to transmit USB signals. A first group of pins of the first USB hub IC 601 are connected to the first connector 700. A second group of pins of the first USB hub IC 601 are connected to a first group of pins of the second USB hub IC 602. A third group of pins of the first USB hub IC 601 are connected to a USB connector 701. A second group of pins of the second USB hub IC 602 are connected to a first group of pins of the third USB hub IC 603. A third group of pins of the second USB hub IC 602 are connected to a USB connector 702. A second group of pins of the third USB hub IC 603 are connected to a first group of pins of the fourth USB hub IC 604. A third group of pins of the third USB hub IC 603 are connected to a USB connector 703. A second group of pins of the fourth USB hub IC 604 are connected to a first group of pins of the fifth USB hub IC 605. A third group of pins of the fourth USB hub IC 604 are connected to a USB connector 704. A second group of pins of the fifth USB hub IC 605 are connected to the second connector 706. A third group of pins of the fifth USB hub IC 605 are connected to a USB connector 705. Each of the first to fifth USB hub IC 601-605 includes a clock pin connected to a clock generator 801 to ensure the operation sequences of the first to fifth USB hub IC 601-605 are the same. Each of the first to fifth USB hub IC 601-605 includes a power pin connected to a power connector 802 to receive the operation voltage. The above-mentioned connection of the pins of the first to fifth USB hub IC 601-605 are achieved by means of traces on the PCB 100. The USB connectors 701-705, the first connector 700, and the second connector 706 are used to connect peripheral devices. The power connector 802 is used to connect a power supply.

Figure 2:
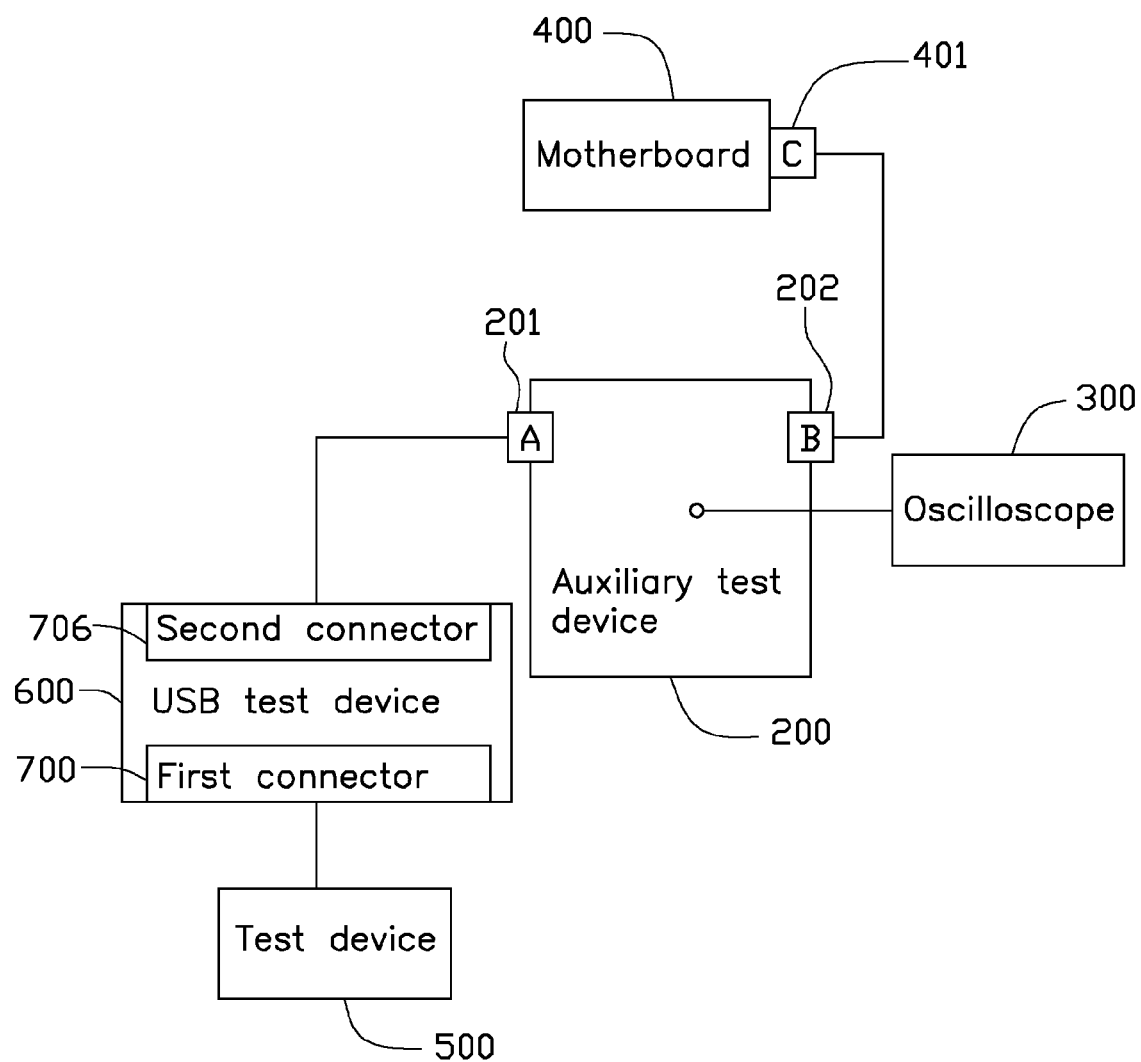
FIG. 2 is a block diagram of the USB signal test device of FIG. 1 in use.

FIG. 2 is a block diagram of the USB signal test device in use.

The USB signal test device 600 is connected to a test device 500 through the first connector 700 to receive USB signals from the test device. The USB signal test device 600 is connected to an auxiliary test device 200. The auxiliary test device 200 includes a USB hub and a test connector. The USB hub includes a first USB connector 201 (labeled A in FIG. 2) and a second USB connector 202 (labeled B in FIG. 2). The first USB connector 201 is connected to the second connector 706. The second USB connector 202 is connected to a third USB connector 401 (labeled C in FIG. 2) of a motherboard 400. An oscilloscope 300 is connected to a test terminal of the auxiliary test device 200.

In the embodiment, the USB signal is passed through the first to fifth USB hub IC 601-605 and the auxiliary test device 200 in that order. The oscilloscope 300 will measure the signal transmitted for six times. In another embodiment, the first USB connector 201 can be connected to the USB connector 702. The oscilloscope 300 measures the signal transmitted for three times.

While the disclosure has been described by way of example and in terms of preferred embodiment, it is to be understood that the disclosure is not limited thereto. To the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A universal serial bus (USB) signal test device, comprising:
   a printed circuit board (PCB);
   a first connector arranged on the PCB and connectable to a test device to receive USB signals from the test device;
   a plurality of USB hub integrated circuits (ICs) connected in series, wherein each of the USB hub IC comprises a first group of pins and a second group of pins; the first group of pins of a first one of the plurality of USB hub ICs is connected to the first connector, the first group of pins of another USB hub IC is connected to the second group of pins of an adjacent previous USB hub IC;
   a second connector connected to the second group of pins of a last one of the plurality of USB hub ICs to output the USB signals;
   a power connector connected to a power pin of each of the plurality of USB hub ICs;
   a clock generator connected to a clock pin of each of the plurality of USB hub ICs.

2. The USB signal test device of claim 1, further comprising a plurality of USB connectors, wherein each of the plurality of USB hub ICs comprises a third group of pins, the third group of pins of each USB hub IC is connected to a corresponding one of the plurality of USB connectors.

3. The USB signal test device of claim 1, wherein the connection of the first and second groups of pins of the plurality of USB hub ICs are through traces on the PCB.

* * * * *